US012786774B2

(12) United States Patent
Raghavan et al.

(10) Patent No.: US 12,786,774 B2
(45) Date of Patent: Nov. 3, 2026

(54) METHODS FOR FEEDBACK OF SIGNAL STRENGTH METRICS OF DIFFERENT SIGNAL STRENGTH GROUPS WITH REFERENCE SIGNAL TRAINING

(71) Applicant: QUALCOMM Incorporated, San Diego, CA (US)

(72) Inventors: Vasanthan Raghavan, West Windsor Township, NJ (US); Juergen Cezanne, Ocean Township, NJ (US); Yu Zhang, San Diego, CA (US); Jing Sun, San Diego, CA (US); Jing Jiang, San Diego, CA (US); Junyi Li, Greentown, PA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 18/795,869

(22) Filed: Aug. 6, 2024

(65) Prior Publication Data

US 2026/0046653 A1 Feb. 12, 2026

(51) Int. Cl.
*H04W 24/10* (2009.01)

(52) U.S. Cl.
CPC .................................. *H04W 24/10* (2013.01)

(58) Field of Classification Search
CPC ..... H04W 24/10; H04W 76/27; H04W 24/08; H04W 72/23; H04W 88/04; H04W 72/21; H04W 48/12; H04W 72/02; H04W 72/51; H04W 72/04; H04W 72/541; H04W 72/542; H04W 24/02; H04B 7/06952; H04B 17/328; H04B 7/088; H04B 7/0626; H04B 7/0632; H04B 7/024; H04B 17/318; H04B 7/0404; H04B 7/0695; H04B 7/0413; H04B 7/0608; H04B 7/0452; H04L 5/0048; H04L 5/0053; H04L 5/0051; H04L 5/005; H04L 1/0026
See application file for complete search history.

(56) References Cited

U.S. PATENT DOCUMENTS

2020/0059290 A1* 2/2020 Pan .................... H04B 7/06952
2022/0190977 A1* 6/2022 Lee ...................... H04B 17/336
(Continued)

FOREIGN PATENT DOCUMENTS

WO WO-2023077401 A1 5/2023

OTHER PUBLICATIONS

International Search Report and Written Opinion—PCT/US2025/039914—ISA/EPO—Nov. 24, 2025.

*Primary Examiner* — Olumide Ajibade Akonai
(74) *Attorney, Agent, or Firm* — Holland & Hart LLP

(57) ABSTRACT

Methods, systems, and devices for wireless communications are described. Generally, the described techniques may enable a user equipment (UE) to receive control signaling indicating a first signal strength threshold and a second signal strength threshold that define multiple signal strength groups. The control signaling may further indicate a quantity of reference signal beams for each group of the signal strength groups for the UE to report. In some examples, the UE may report a quantity of reference signals for each group per antenna module of the UE. Reporting a combination of reference signal beams with relatively high and relatively low signal strengths relative to the signal strength thresholds, may enable a network entity to schedule resources more efficiently.

20 Claims, 9 Drawing Sheets

(56) References Cited

U.S. PATENT DOCUMENTS

| | | | | |
|---|---|---|---|---|
| 2022/0263558 | A1 | 8/2022 | Zhu et al. | |
| 2022/0368395 | A1 | 11/2022 | Bai et al. | |
| 2023/0387992 | A1* | 11/2023 | Guo | H04B 7/088 |
| 2024/0022299 | A1* | 1/2024 | Zhu | H04B 7/0617 |
| 2024/0072868 | A1* | 2/2024 | Sun | H04B 7/0639 |
| 2025/0294391 | A1 | 9/2025 | Wang et al. | |
| 2026/0128778 | A1* | 5/2026 | Wang | H04B 7/06952 |

* cited by examiner

METHODS FOR FEEDBACK OF SIGNAL STRENGTH METRICS OF DIFFERENT SIGNAL STRENGTH GROUPS WITH REFERENCE SIGNAL TRAINING

FIELD OF TECHNOLOGY

The following relates to wireless communications, including methods for feedback of signal strength metrics of different signal strength groups with reference signal training.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a UE may receive one or more reference signal beams from a network entity, measure a signal strength of each of the one or more reference signal beams, and transmit a report to the network entity.

SUMMARY

The systems, methods, and devices of this disclosure each have several innovative aspects, no single one of which is solely responsible for the desirable attributes disclosed herein.

A method for wireless communications by a user equipment (UE) is described. The method may include receiving control signaling indicating a first signal strength threshold and a second signal strength threshold, the first signal strength threshold and the second signal strength threshold defining a set of multiple signal strength groups, where the control signaling further indicates to report up to a respective quantity of reference signal beams for each group of the set of multiple signal strength groups and a set of multiple reference signal resources to monitor, monitoring a set of multiple reference signal beams via the set of multiple reference signal resources, and transmitting a report indicating a quantity of reference signal beams up to the respective quantity of reference signal beams in each group of the set of multiple signal strength groups based on a signal strength measurement of a respective reference signal beam of the quantity of reference signal beams relative to the first signal strength threshold, the second signal strength threshold, or both.

A UE for wireless communications is described. The UE may include one or more memories storing processor executable code, and one or more processors coupled with the one or more memories. The one or more processors may individually or collectively be operable to execute the code to cause the UE to receive control signaling indicating a first signal strength threshold and a second signal strength threshold, the first signal strength threshold and the second signal strength threshold defining a set of multiple signal strength groups, where the control signaling further indicates to report up to a respective quantity of reference signal beams for each group of the set of multiple signal strength groups and a set of multiple reference signal resources to monitor, monitor a set of multiple reference signal beams via the set of multiple reference signal resources, and transmit a report indicating a quantity of reference signal beams up to the respective quantity of reference signal beams in each group of the set of multiple signal strength groups based on a signal strength measurement of a respective reference signal beam of the quantity of reference signal beams relative to the first signal strength threshold, the second signal strength threshold, or both.

Another UE for wireless communications is described. The UE may include means for receiving control signaling indicating a first signal strength threshold and a second signal strength threshold, the first signal strength threshold and the second signal strength threshold defining a set of multiple signal strength groups, where the control signaling further indicates to report up to a respective quantity of reference signal beams for each group of the set of multiple signal strength groups and a set of multiple reference signal resources to monitor, means for monitoring a set of multiple reference signal beams via the set of multiple reference signal resources, and means for transmitting a report indicating a quantity of reference signal beams up to the respective quantity of reference signal beams in each group of the set of multiple signal strength groups based on a signal strength measurement of a respective reference signal beam of the quantity of reference signal beams relative to the first signal strength threshold, the second signal strength threshold, or both.

A non-transitory computer-readable medium storing code for wireless communications is described. The code may include instructions executable by one or more processors to receive control signaling indicating a first signal strength threshold and a second signal strength threshold, the first signal strength threshold and the second signal strength threshold defining a set of multiple signal strength groups, where the control signaling further indicates to report up to a respective quantity of reference signal beams for each group of the set of multiple signal strength groups and a set of multiple reference signal resources to monitor, monitor a set of multiple reference signal beams via the set of multiple reference signal resources, and transmit a report indicating a quantity of reference signal beams up to the respective quantity of reference signal beams in each group of the set of multiple signal strength groups based on a signal strength measurement of a respective reference signal beam of the quantity of reference signal beams relative to the first signal strength threshold, the second signal strength threshold, or both.

Some examples of the method, UEs, and non-transitory computer-readable medium described herein may further include operations, features, means, or instructions for transmitting a capability message indicating a set of multiple antenna modules of the UE, where the report further indicates the quantity of reference signal beams up to the respective quantity of reference signal beams in each group for each antenna module based on a signal strength measurement of a respective reference signal beam at a respective antenna module relative to the first signal strength threshold, the second signal strength threshold, or both.

Some examples of the method, UEs, and non-transitory computer-readable medium described herein may further include operations, features, means, or instructions for receiving, based on the report, configuration information indicating at least one receive beam to use for subsequent communication with a network entity.

In some examples of the method, UEs, and non-transitory computer-readable medium described herein, the report indicates a range of reference signal identifiers associated with one or more groups of the set of multiple signal strength groups. In some examples of the method, UEs, and non-transitory computer-readable medium described herein, the report further indicates one or more resource indicators, one or more reference signal identifiers, or both.

In some examples of the method, UEs, and non-transitory computer-readable medium described herein, the report further indicates a signal strength measurement of one or more reference signal beams of the quantity of reference signal beams for one or more groups of the set of multiple signal strength groups. In some examples of the method, UEs, and non-transitory computer-readable medium described herein, the set of multiple signal strength groups include a first signal strength group of reference signal beams with respective signal strength measurements above the first signal strength threshold, a second signal strength group of reference signal beams with respective signal strength measurements between the first signal strength threshold and the second signal strength threshold, a third signal strength group of reference signal beams with respective signal strength measurements below the second signal strength threshold, or any combination thereof.

In some examples of the method, UEs, and non-transitory computer-readable medium described herein, the set of multiple reference signal beams may be synchronization signal block (SSB) beams, channel state information reference signal (CSI-RS) beams, demodulation reference signal (DMRS) beams, or a combination of one or more SSB beams, one or more CSI-RS beams, and one or more DMRS beams.

In some examples of the method, UEs, and non-transitory computer-readable medium described herein, the signal strength measurement may be a reference signal received power (RSRP) measurement associated with a reference signal beam of the set of multiple reference signal beams, a signal to interference and noise ratio (SINR) measurement associated with a reference signal beam of the set of multiple reference signal beams, or both.

A method for wireless communications at a UE by an apparatus is described. The method may include receiving control signaling indicating a first signal strength threshold and a second signal strength threshold, the first signal strength threshold and the second signal strength threshold defining a set of multiple signal strength groups, where the control signaling further indicates to report up to a respective quantity of reference signal beams for each group of the set of multiple signal strength groups and a set of multiple reference signal resources to monitor, monitoring a set of multiple reference signal beams via the set of multiple reference signal resources, and transmitting a report indicating a quantity of reference signal beams up to the respective quantity of reference signal beams in each group of the set of multiple signal strength groups based on a signal strength measurement of a respective reference signal beam of the quantity of reference signal beams relative to the first signal strength threshold, the second signal strength threshold, or both.

An apparatus for wireless communications at a UE is described. The apparatus may include one or more memories storing processor executable code, and one or more processors coupled with the one or more memories. The one or more processors may individually or collectively be operable to execute the code to cause the apparatus to receive control signaling indicating a first signal strength threshold and a second signal strength threshold, the first signal strength threshold and the second signal strength threshold defining a set of multiple signal strength groups, where the control signaling further indicates to report up to a respective quantity of reference signal beams for each group of the set of multiple signal strength groups and a set of multiple reference signal resources to monitor, monitor a set of multiple reference signal beams via the set of multiple reference signal resources, and transmit a report indicating a quantity of reference signal beams up to the respective quantity of reference signal beams in each group of the set of multiple signal strength groups based on a signal strength measurement of a respective reference signal beam of the quantity of reference signal beams relative to the first signal strength threshold, the second signal strength threshold, or both.

Another apparatus for wireless communications at a UE is described. The apparatus may include means for receiving control signaling indicating a first signal strength threshold and a second signal strength threshold, the first signal strength threshold and the second signal strength threshold defining a set of multiple signal strength groups, where the control signaling further indicates to report up to a respective quantity of reference signal beams for each group of the set of multiple signal strength groups and a set of multiple reference signal resources to monitor, means for monitoring a set of multiple reference signal beams via the set of multiple reference signal resources, and means for transmitting a report indicating a quantity of reference signal beams up to the respective quantity of reference signal beams in each group of the set of multiple signal strength groups based on a signal strength measurement of a respective reference signal beam of the quantity of reference signal beams relative to the first signal strength threshold, the second signal strength threshold, or both.

A non-transitory computer-readable medium storing code for wireless communications at a UE is described. The code may include instructions executable by one or more processors to receive control signaling indicating a first signal strength threshold and a second signal strength threshold, the first signal strength threshold and the second signal strength threshold defining a set of multiple signal strength groups, where the control signaling further indicates to report up to a respective quantity of reference signal beams for each group of the set of multiple signal strength groups and a set of multiple reference signal resources to monitor, monitor a set of multiple reference signal beams via the set of multiple reference signal resources, and transmit a report indicating a quantity of reference signal beams up to the respective quantity of reference signal beams in each group of the set of multiple signal strength groups based on a signal strength measurement of a respective reference signal beam of the quantity of reference signal beams relative to the first signal strength threshold, the second signal strength threshold, or both.

Some examples of the method, apparatus, and non-transitory computer-readable medium described herein may further include operations, features, means, or instructions for transmitting a capability message indicating a set of multiple antenna modules of the UE, where the report further indicates the quantity of reference signal beams up to the respective quantity of reference signal beams in each group for each antenna module based on a signal strength measurement of a respective reference signal beam at a respective antenna module relative to the first signal strength threshold, the second signal strength threshold, or both.

Another apparatus for a UE is described. The apparatus may include one or more memories storing processor-executable code, one or more processors coupled with the one or more memories and individually or collectively operable to execute the code to cause the UE to, receive control signaling indicating a first signal strength threshold and a second signal strength threshold, the first signal strength threshold and the second signal strength threshold defining a set of multiple signal strength groups, where the control signaling further indicates to report up to a respective quantity of reference signal beams for each group of the set of multiple signal strength groups and a set of multiple reference signal resources to monitor, monitor a set of multiple reference signal beams via the set of multiple reference signal resources, and transmit a report indicating a quantity of reference signal beams up to the respective quantity of reference signal beams in each group of the set of multiple signal strength groups based on a signal strength measurement of a respective reference signal beam of the quantity of reference signal beams relative to the first signal strength threshold, the second signal strength threshold, or both.

In some examples of the apparatus, the one or more processors may be individually or collectively further operable to execute the code to cause the UE to transmit a capability message indicating a set of multiple antenna modules of the UE, where the report further indicates the quantity of reference signal beams up to the respective quantity of reference signal beams in each group for each antenna module based on a signal strength of each reference signal beam at each antenna module relative to the first signal strength threshold, the second signal strength threshold, or both.

In some examples of the apparatus, the one or more processors may be individually or collectively further operable to execute the code to cause the UE to receive, based on the report, configuration information indicating at least one receive beam to use for subsequent communication with a network entity.

In some examples of the apparatus, the report indicates a range of reference signal identifiers associated with one or more groups of the set of multiple signal strength groups. In some examples of the apparatus, the report further indicates one or more resource indicators, one or more reference signal identifiers, or both.

In some examples of the apparatus, the report further indicates a signal strength measurement of one or more reference signal beams of the quantity of reference signal beams for one or more groups of the set of multiple signal strength groups. In some examples of the apparatus, the set of multiple signal strength groups include a first signal strength group of reference signal beams with respective signal strength measurements above the first signal strength threshold, a second signal strength group of reference signal beams with respective signal strength measurements between the first signal strength threshold and the second signal strength threshold, a third signal strength group of reference signal beams with respective signal strength measurements below the second signal strength threshold, or any combination thereof.

In some examples of the apparatus, the set of multiple reference signal beams may be SSB beams, CSI-RS beams, DMRS beams, or a combination of one or more SSB beams, one or more CSI-RS beams, and one or more DMRS beams. In some examples of the apparatus, the signal strength measurement may be an RSRP measurement associated with a reference signal beam of the set of multiple reference signal beams, an SINR measurement associated with a reference signal beam of the set of multiple reference signal beams, or both.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1:
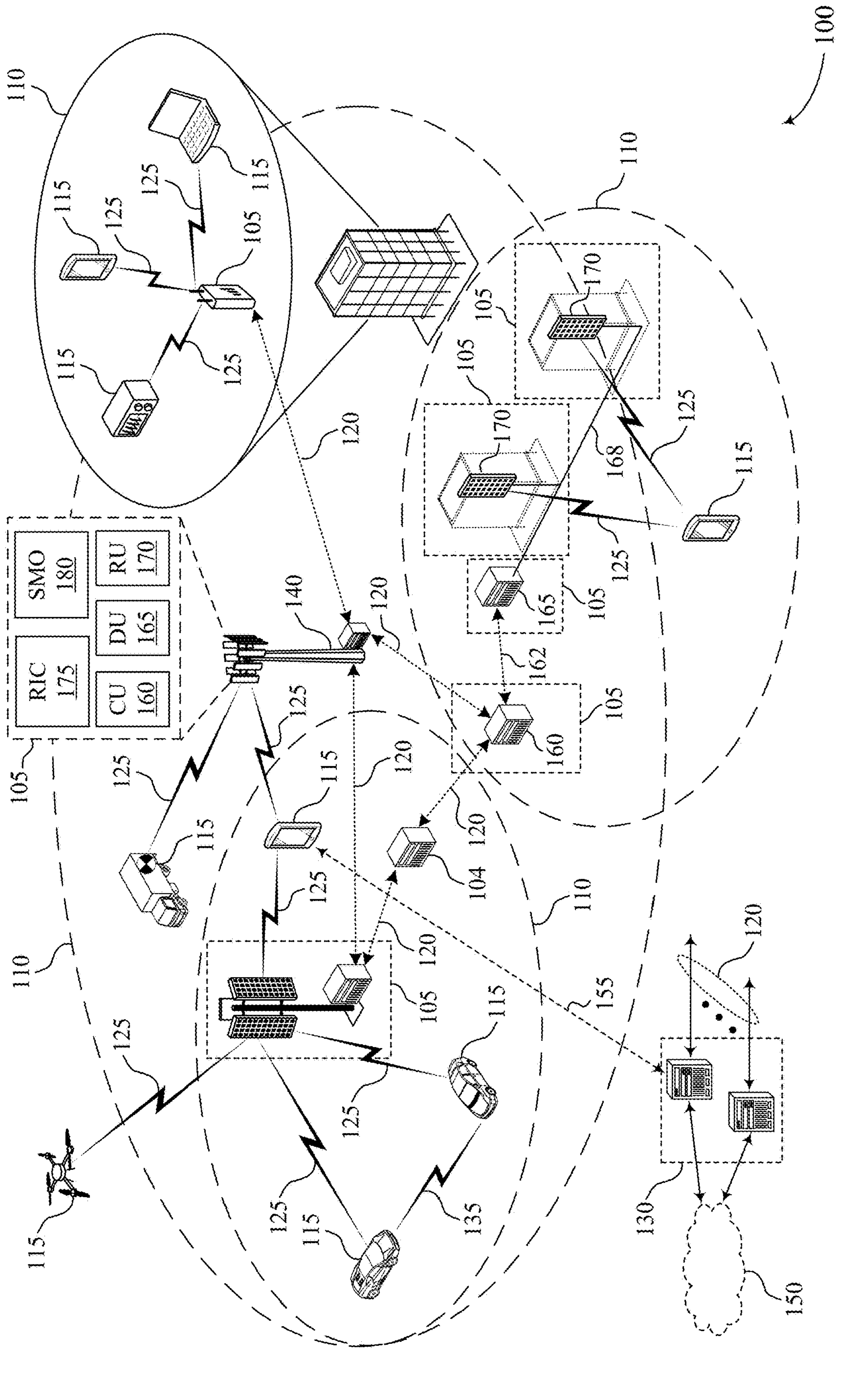
FIGS. 1 and 2 show examples of wireless communications systems that support methods for feedback of signal strength metrics of different signal strength groups with reference signal training in accordance with one or more aspects of the present disclosure.

In some wireless communications systems, a network entity may transmit one or more reference signals over beams (e.g., beam weights over an antenna array) to a user equipment (UE) along multiple directions. The UE may monitor for, and measure a signal strength of each of the one or more reference signals. For example, the UE may measure a reference signal received power (RSRP) and/or signal-to-interference plus noise ratio (SINR) of each of the reference signals. Reference signals with relatively high signal strengths (e.g., "good beams") may correspond to signal subspaces for the UE, whereas reference signals with relatively low signal strengths (e.g., "bad or poor beams") may correspond to null spaces for the UE. In some other wireless communications systems, a UE may typically measure and report the four beams with the highest measured signal strength (e.g., the best four beams). However, in such other wireless communications systems, there may be no explicit definition and/or requirement for the UE to report the four beams with the highest signal strength. That is, it may be ambiguous whether the reported reference signals are the reference signals with the highest measured signal strength, the reference signals with the lowest measured signal strength, or a combination thereof.

The techniques described herein may enable a UE to receive control signaling that implicitly or explicitly configures a first signal strength threshold and a second signal strength threshold, which together define multiple signal strength groups (e.g., three signal strength groups). In some examples, a first signal strength group may correspond to reference signals with the highest measured signal strength, whereas second and third signal strength groups may correspond to reference signals with lower measured signal strengths. The control signaling may also configure a quantity of reference signals for each group of the signal strength groups for the UE to report. For example, the UE may report up to the configured quantity of beams (e.g., the UE may not receive all beams transmitted by the network entity) for each group. In some examples, a network entity may transmit the control signaling to the UE via a radio resource control (RRC) message, a downlink control information (DCI) message, or a medium-access control-control element (MAC-CE) message.

In some examples, the UE may report a quantity of reference signals for each group per antenna module of the UE. Reporting a combination of reference signals with relatively high and relatively low signal strengths defined relative to the signal strength thresholds may enable a network entity to schedule resources more efficiently. For example, the network entity may simultaneously schedule resources for a first UE and a second UE using the same reference signal based on the first UE reporting that the reference signal is below the second signal strength threshold and the second UE reporting that the reference signal is above the first signal strength threshold. That is, the network entity may schedule resources based on an alignment of useful beamspace for each UE relative to non-useful beamspace for other UEs (e.g., and vice versa).

Aspects of the disclosure are initially described in the context of wireless communications systems. Aspects of the disclosure are further illustrated by and described with reference to a process flow, apparatus diagrams, system diagrams, and flowcharts that relate to methods for feedback of signal strength metrics of different signal strength groups with reference signal training.

FIG. 1 shows an example of a wireless communications system 100 that supports methods for feedback of signal strength metrics of different signal strength groups with reference signal training in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some wireless communications systems, a network entity 105 may transmit one or more reference signals over beams to a UE 115 along multiple (e.g., disjoint) directions. The UE 115 may monitor for, and measure a signal strength of each of the one or more reference signals. For example, the UE 115 may measure an RSRP and/or SINR of each of the reference signals. Reference signals with relatively high signal strengths (e.g., "good beams") may correspond to signal subspaces for the UE 115, whereas reference signals with relatively low signal strengths (e.g., "bad or poor beams") may correspond to null spaces for the UE 115. In some other wireless communications systems, a UE 115 may typically measure and report the four beams with the highest measured signal strength (e.g., the best four beams). However, in such other wireless communications systems, there may be no explicit definition and/or requirement for the UE 115 to report the four beams with the highest signal strength. That is, it may be ambiguous whether the reported reference signals are the reference signals with the highest measured signal strength, the reference signals with the lowest measured signal strength, or a combination thereof.

The techniques described herein may enable a UE 115 to receive control signaling that implicitly or explicitly configures a first signal strength threshold and a second signal strength threshold, which together define multiple signal strength groups (e.g., three signal strength groups). In some examples, a first signal strength group may correspond to reference signals with the highest measured signal strength, whereas second and third signal strength groups may correspond to reference signals with lower measured signal strengths. The control signaling may also configure a quantity of reference signals for each group of the signal strength groups for the UE 115 to report. For example, the UE 115 may report up to the configured quantity of beams (e.g., the UE 115 may not receive all beams transmitted by the network entity 105) for each group. In some examples, a network entity 105 may transmit the control signaling to the UE 115 via an RRC message, a DCI message, or a MAC-CE message.

In some examples, the UE 115 may report a quantity of reference signals for each group per antenna module of the UE 115. Reporting a combination of reference signal beams with relatively high and relatively low signal strengths defined relative to the signal strength thresholds may enable a network entity 105 to schedule resources more efficiently. For example, the network entity 105 may simultaneously schedule resources for a first UE 115 and a second UE 115 using the same reference signal based on the first UE 115 reporting that the reference signal is below the second signal strength threshold and the second UE 115 reporting that the reference signal is above the first signal strength threshold. That is, the network entity 105 may schedule resources based on an alignment of useful beamspace for each UE 115 relative to non-useful beamspace for other UEs 115 (e.g., and vice versa).

Figure 2:
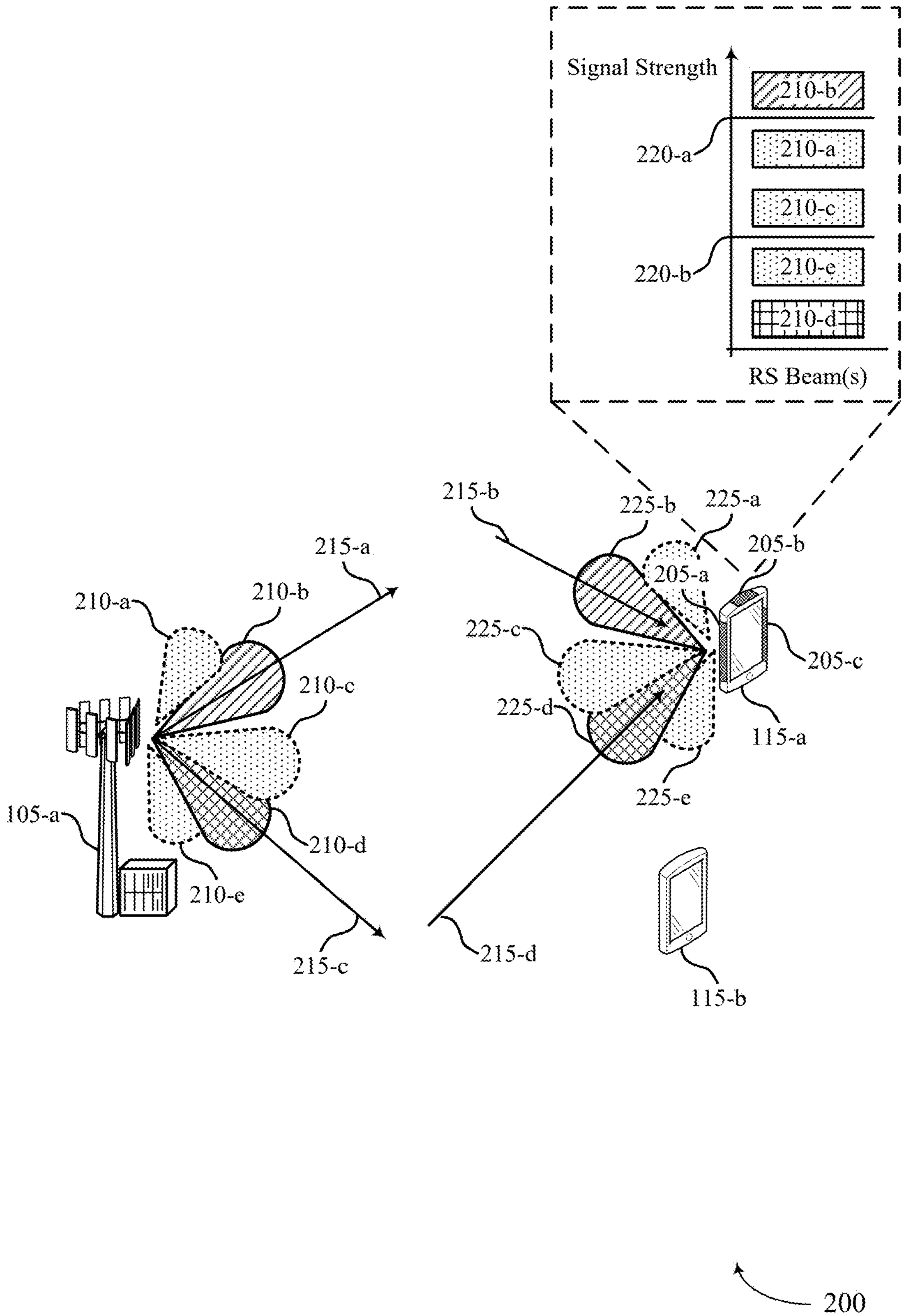

FIG. 2 shows an example of a wireless communications system 200 that supports methods for feedback of signal strength metrics of different signal strength groups with reference signal training in accordance with one or more aspects of the present disclosure. The wireless communications system may implement, or may be implemented by, aspects of the wireless communications system 100, as described with reference to FIG. 1. For example, the wireless communications system 200 may include a UE 115-*a*, a UE 115-*b*, and a network entity 105-*a*, which may be examples of the corresponding devices described herein, including with reference to FIG. 1. In some examples, the UE 115-*a* may measure one or more reference signals 210 via respective signal paths 215 using one or more beams 225 (e.g., receive beams). As described herein, the one or more reference signals 210 may be synchronization signal block (SSB) beams, CSI-RS beams, demodulation reference signal (DMRS) beams, or any combination thereof. That is, the techniques described herein may be understood to apply to CSI-RS resource indicator (CRI) reporting. As described herein, it may be understood that reference signals (e.g., reference signals transmitted over one or more beams) may be referred to as reference signal beams.

In some examples, the network entity 105-*a* may transmit the one or more reference signals 210 in accordance with a periodicity (e.g., 5 ms, 10 ms, 20 ms, etc.). The network entity 105-*a* may also transmit the one or more reference signals 210 along multiple (e.g., disjoint, partially overlapping, etc.) directions. For example, the network entity 105-*a* may transmit a first reference signal 210-*a* in a first direction, a second reference signal 210-*b* in a second direction, a third reference signal 210-*c* in a third direction, a fourth reference signal 210-*d* in a fourth direction, or a fifth reference signal 210-*e* in a fifth direction. In some cases, each beam used over the one or more reference signals 210 may include one or more beams with a same Azimuth angle Of Departure (AOD) or a same Zenith angle Of Departure (ZOD), and with different polarizations. That is, for each reference signal 210, the network entity 105-*a* may transmit an analog beam and a digital beam with different polarizations.

Each of the one or more reference signals 210 may travel along a respective signal path 215 (not all signal paths are illustrated for clarity purposes). Note that each signal path may correspond to reflection via a metallic or glass object as an illustrative mode of communications. For example, the second reference signal 210-*b* may travel along a first signal path 215-*a* and the fourth reference signal 210-*d* may travel along a second signal path 215-*c*. While traveling along a signal path 215, a respective reference signal 210 may reflect off an object (e.g., a vehicle, a building, a wall, etc.) or cluster in a physical channel between the network entity 105-*a* and a UE 115. For example, the second reference signal 210-*b* may reflect off a first object, changing the path of the second reference signal 210-*b* from the first signal path 215-*a* to a third signal path 215-*b*. Similarly, the fourth reference signal 210-*d* may cluster in the physical channel, which may change the path of the fourth reference signal 210-*d* from the second signal path 215-*c* to a fourth signal path 215-*d*. In some examples, a respective reference signal 210 may not reflect off an object, and the UE 115-*a* may receive the respective reference signal 210 directly. That is, the first signal path 215-*a* and the third signal path 215-*b* may be the same signal path 215 in some cases.

In some examples, the UE 115-*a* may monitor for, and receive, the one or more reference signals 210. For example, the UE 115-*a* may have beams 225-*a*, 225-*b*, 225-*c*, 225-*d*, and 225-*c*, that may be used as transmit beams for uplink communications and as receive beams for downlink communications, including monitoring of the reference signals 210-*a* through 210-*e*. For example, the UE 115-*a* may monitor each of the reference signals 210-*a* through 210-*e* using each of the beams 225. That is, the UE 115-*a* may monitor reference signals 210-*a*, 210-*b*, 210-*c*, 210-*d*, and 210-*e* using beam 225-*a* prior to monitoring the reference signals 210-*a* through 210-*e* using beam 225-*b* (e.g., and so on until the UE 115-*a* has monitored the reference signals 210-*a* through 210-*e* using each beam 225-*a* through 225-*e*). The UE 115-*a*, using beams 225-*a* through 225-*e*, may observe different signal strengths with respect to the corresponding reference signals 210-*a* through 210-*e* based on their respective signal paths 215 (e.g., a reflected beam may have a weaker signal strength compared to its initial transmission).

In some examples, the UE 115-*a* may receive the one or more reference signals 210 via one or more antenna modules 205. As described herein, the one or more antenna modules 205 may be referred to as antenna panels. The one or more antenna modules 205 may be positioned on different locations of the UE 115-*a*. For example, a first antenna module 205-*a* may be located on a first side of the UE 115-*a*, a second antenna module 205-*b* may be located on a second side of the UE 115-*a*, and a third antenna module 205-*c* may be located on a third side of the UE 115-*a*. The one or more antenna modules 205 may increase a capability of the UE 115-*a* to receive signaling, such as the one or more reference signals 210.

The UE 115-*a* may measure a signal strength of each of the one or more reference signals 210. For example, the UE 115-*a* may measure the RSRP or SINR of each of the reference signals 210-*a* through 210-*e* using the beams 225 (e.g., receive beams). Reference signals 210 with relatively high signal strengths (e.g., "good beams") may correspond to signal subspaces for the UE 115-*a*, whereas reference signals 210 with relatively low signal strengths (e.g., "bad or poor beams") may correspond to null spaces for the UE 115-*a*. In some examples, a null space for the UE 115-*a* may enable the network entity 105-*a* to use the null space as a signal subspace for another UE (e.g., the UE 115-*b*) without substantially reducing a sum rate in MU-MIMO transmissions.

In some other wireless communications systems, a UE 115 may typically measure and report four beams with the highest measured signal strength (e.g., the best four beams). However, in such other wireless communications systems, there may be no explicit definition and/or requirement for the UE 115 to report the four beams with the highest signal strength. That is, it may be ambiguous whether the reported reference signal beams are the reference signals with the highest measured signal strength, the reference signals with the lowest measured signal strength, or a combination thereof.

The techniques described herein may enable the UE 115-*a* to receive control signaling that implicitly or explicitly configures a first signal strength threshold 220-*a* and a second signal strength threshold 220-*b*, which together define multiple signal strength groups. The control signaling may also configure a quantity of reference signals 210 for each group of the signal strength groups for the UE 115-*a* to report. In some examples, the network entity 105-*a* may transmit the control signaling to the UE 115-*a* via an RRC message, a DCI message, or a MAC-CE message. Reporting a combination of reference signals 210 with relatively high and relatively low signal strengths defined relative to the signal strength thresholds 220, may enable the network entity 105-*a* to schedule resources more efficiently. For example, the network entity 105-*a* may simultaneously schedule resources for the UE 115-*a* and the UE 115-*b* using the reference signal 210-*d* based on the UE 115-*a* reporting that the reference signal 210-*d* is below the second signal strength threshold 220-*b* and the UE 115-*b* reporting that the reference signal 210-*d* is above the first signal strength threshold 220-*a*. That is, the network entity 105-*a* may schedule resources based on an alignment of useful beamspace for each UE 115 relative to non-useful beamspace for other UEs 115 (e.g., and vice versa).

In some examples, the quantity of possible identifiers corresponding to each of the one or more reference signals 210 may be limited (e.g., the network entity may transmit a maximum respective quantity of reference signals 210). For example, the network entity 105-*a* may transmit up to 64 reference signals 210 that correspond to a unique identifier. In such examples, the UE 115-*a* may classify (e.g., into the signal strength groups) and report up to a respective quantity of reference signals 210 (e.g., up to 64 identifiers).

As described herein, the UE 115-*a* may report up to the respective quantity because the UE 115-*a* may not monitor all of the reference signals 210 transmitted by the network entity 105-*a* using the beams 225-*a* through 225-*e*. For example, the network entity 105-*a* may transmit 64 reference signals 210, and the UE 115-*a* may monitor a portion of the 64 reference signals 210 (e.g., the UE 115-*a* may monitor 56 reference signals 210). The network entity 105-*a* may transmit the control signaling to configure the UE 115-*a* to report up to 64 reference signals 210, but the UE 115-*a* may only report the monitored reference signals 210.

In the example of FIG. 2, the signal strength thresholds 220 may define three signal strength groups. For example, the first signal strength group may include reference signals 210 with respective signal strength measurements above the first signal strength threshold 220-*a*. For example, the first signal strength group may include the reference signal 210-*b*. Reference signals 210 in the first signal strength group may correspond to the "best" beams. For example, the UE 115-*a* may receive 8 decodable reference signals 210 out of 64 reference signals 210 (e.g., 8 out of 64 SSB IDs) and may only report the best 2 reference signals. A respective reference signal 210 may be decodable if the UE 115-*a* may decode a physical broadcast channel (PBCH) associated with the respective reference signal 210.

The second signal strength group may include reference signals 210 with respective signal strength measurements between the signal strength thresholds 220. For example, the second signal strength group may include the reference signal 210-*a* and reference signal 210-*c*. Reference signals 210 in the second signal strength group may correspond to reference signals that are decodable by the UE 115-*a*, but their signal strengths may not be sufficient for uplink transmission by any of the beams 225-*a* through 225-*e*. For example, the UE 115-*a* may report the bottom 2 of the 8 decodable reference signals 210.

The third signal strength group may include reference signals 210 with respective signal strength measurements below the second signal strength threshold 220-*b*. For example, the third signal strength group may include the reference signal 210-*e* and the reference signal 210-*d*. Reference signals in the third signal strength group may not be decodable by the UE 115-*a* and may correspond to a null beamspace of the UE 115-*a* (e.g., the reference signals in the third group may be the "poor or worst" beams). In some cases, the second and third signal strength groups may both correspond to bad beams.

In some examples, the UE 115-*a* may report a respective quantity of reference signals 210 for each group. That is, the UE 115-*a* may receive the control signaling (e.g., CSI-ReportConfig), which may instruct the UE 115-*a* to report, in a single report, a quantity of "good" beams (e.g., nrofReportedRSGood) and a quantity of "bad" beams (e.g., nrofReportedRSBad). For example, the UE 115-*a* may receive an indication (e.g., via the control signaling) to report one reference signal (e.g., an identifier corresponding to the reference signal) per signal strength group. Based on the indication, the UE 115-*a* may select either reference signal 210-*a* or reference signal 210-*c* to report for the second signal strength group, and the UE 115-*a* may select either the reference signal 210-*e* or the reference signal 210-*d* for the third signal strength group (e.g., based on whether the UE 115-*a* selects the best or worst beam in each group). In some examples, the UE 115-*a* may report the one or more reference signals 210 via a codebook, where the codebook may include the identifiers corresponding to each of the one or more reference signals 210. For example, the control signaling may configure the codebook and the UE 115-*a* may report the identifiers (e.g., beam indices) corresponding to the reference signals 210 from the codebook.

In some examples, the network entity 105-*a* may transmit the one or more reference signals 210 in bursts. For example, the network entity 105-*a* may transmit the first reference signal 210-*a*, the second reference signal 210-*b*, and the third reference signal 210-*c* in a first burst and the network entity 105-*a* may transmit the fourth reference signal 210-*d* and the fifth reference signal 210-*e* in a second burst. In such examples, the UE 115-*a* may measure and report the one or more reference signals 210 over the first burst and the second burst as described herein. In some cases, to measure and report over reference signal bursts (e.g., SSB bursts), the UE 115-*a* may assume a threshold quantity of channel stationarity. That is, the UE 115-*a* may assume that the characteristics of the physical channel (e.g., the PBCH) in which the one or more reference signals 210 are transmitted may not substantially change between the reference signal bursts.

In some examples, the UE 115-*a* may report the reference signals 210 on a per-antenna module 205 basis. In some examples, each antenna module 205 may be associated with respective beams 225. The respective beams 225 at each antenna module may receive the one or more reference signals 210 with differing signal strengths. For example, the first antenna module 205-*a* may receive the reference signal 210-*b* relatively well (e.g., with a signal strength above the first signal strength threshold 220-*a*) and the reference signal 210-*e* relatively poorly (e.g., with a signal strength below the second signal strength threshold 220-*b*). However, the second antenna module 205-*b* may receive the reference signal 210-*e* with a relatively high signal strength (e.g., with a signal strength above the first signal strength threshold 220-*a*). That is, different antenna modules 205 of the UE 115-*a* may measure different signal strengths for the same reference signal 210. Accordingly, it may be beneficial for the UE 115-*a* to report the reference signals 210 on a per-antenna module 205 basis. In some examples, based on reporting per antenna module 205, the network entity 105-*a* may use the reference signal 210-*e* as an alternative beam for scheduling the UE 115-*a* (e.g., over a different antenna module 205) if the reference signal 210-*b* is blocked. That is, if the first antenna module 205-*a* becomes blocked, the network entity may use reference signal 210-*e* for scheduling the UE 115-*a* via the second antenna module 205-*b*.

In some examples, the UE 115-*a* may apply a spatial filter for reception of the one or more reference signals 210. For example, one or more of the antenna modules 205 may be relatively large arrays that enable sharper or narrower beamwidth beams. The one or more relatively large antenna modules 205 may enable the UE 115-*a* to spatially reject other reference signals 210 while receiving one or more reference signals 210 with signal strengths greater than at least the second signal strength threshold 220-*b* (e.g., the UE 115-*a* may reject SSB beams while receiving a good SSB beam). In some examples, the UE 115-*a* may determine one or more identifiers (e.g., SSB-ID and/or CRI) associated with relatively weak signal strengths of one or more reference signals 210 and may report the one or more identifiers along with one or more identifiers (e.g., good SSB-ID/CRI) associated with relatively strong signal strengths of one or more reference signals 210.

In some examples, the identifiers of the reference signals 210 in each of the signal strength groups may depend on which beam 225 (e.g., which receive beam), of multiple possible beams 225 (e.g., 225-*a*, 225-*b*, . . . , 225-*e*) associated with different beam directions (e.g., disjoint, partially overlapping, etc.) is used by a UE 115 for reception. A receive beam may refer to a beam 225 used by the respective UE 115 for reporting and subsequent communications (e.g., MU-MIMO reception) with the network entity 105-*a*. For example, the UE 115-*a* may use the beam 225-*b* as the receive beam and may report the identifier of reference signal 210-*b* as being in the first signal strength group. However, when using beam 225-*d* as the receive beam, UE 115-*a* may report the identifier of reference signal 210-*b* as being in the second or third signal strength group, due to, for example, being misaligned with the reference signal 210-*b*. Which receive beam used by the UE 115-*a* may impact in which signal strength group the UE 115-*a* reports a particular reference signal 210, such as the reference signal 210-*b*. That is, if the UE 115-*a* is using beam 225-*d* to monitor for and receive the reference signals 210, then the UE 115-*a* may report an identifier of the reference signal 210-*b* in the second signal strength group. But when the UE 115-*a* uses beam 225-*b*, then the UE 115-*a* may report an identifier of the reference signal 210-*b* in a different signal strength, such as in group one, which may result in ambiguity at the network entity 105-*a* for scheduling communications.

In some examples, it may be beneficial for the network entity 105-*a* to configure at least one receive beam for a UE 115 to use for reporting and subsequent communications with the network entity 105-*a* (e.g., to remove the ambiguity and to manage interference for communications with other UEs). For example, the UE 115-*a* may receive configuration information that indicates at least one receive beam to use for reporting the reference signals 210. In some examples, the configuration information may explicitly indicate which receive beam for the UE 115-*a* to use. For example, the UE 115-*a* may report each of the beams 225-*a* through 225-*e* to the network entity 105-*a*, and the network entity 105-*a* may transmit the configuration information indicating the at least one receive beam based on the report of the beams (e.g., beams 225-*a* through 225-*e*). In some other examples, the configuration information may implicitly indicate which receive beam for the UE 115-*a* to use. For example, the UE 115-*a* may use a respective receive beam for monitoring a respective reference signal 210 (e.g., the UE 115-*a* may use beam 225-*b* to monitor reference signal 210-*b*). The network entity 105-*a* may implicitly indicate the UE 115-*a* to use a different receive beam by indicating a different reference signal 210 for communications in the configuration information. That is, a different reference signal 210 may be associated with a different beam 225 at the UE 115-*a* (e.g., the UE 115-*a* may monitor the reference signal 210-*c* using beam 225-*c*).

In one example, the UE 115-*a* may receive configuration information indicating the UE 115-*a* to use the beam 225-*b* for reporting and subsequent communications with the network entity 105-*a*. The UE 115-*a* may have previously reported that reference signal 210-*b* is the best reference signal beam (e.g., in the first group or at least falls in the second group) and that the reference signal 210-*d* is its worst beam. Additionally, the UE 115-*b* may report that reference signal 210-*d* is the best reference signal 210 (e.g., based on respective receive beams of the UE 115-*b*). The network entity 105-*a* may use the reference signals 210 reported by the UEs 115-*a* and 115-*b* for scheduling subsequent communications to enhance signal reception while managing (e.g., reducing) interference. For example, the network entity 105-*a* may schedule communications with the UE 115-*a* and the UE 115-*b* simultaneously using reference signal 210-*b* for communications to the UE 115-*a* and reference signal 210-*d* for communications to the UE 115-*b*.

Figure 3:
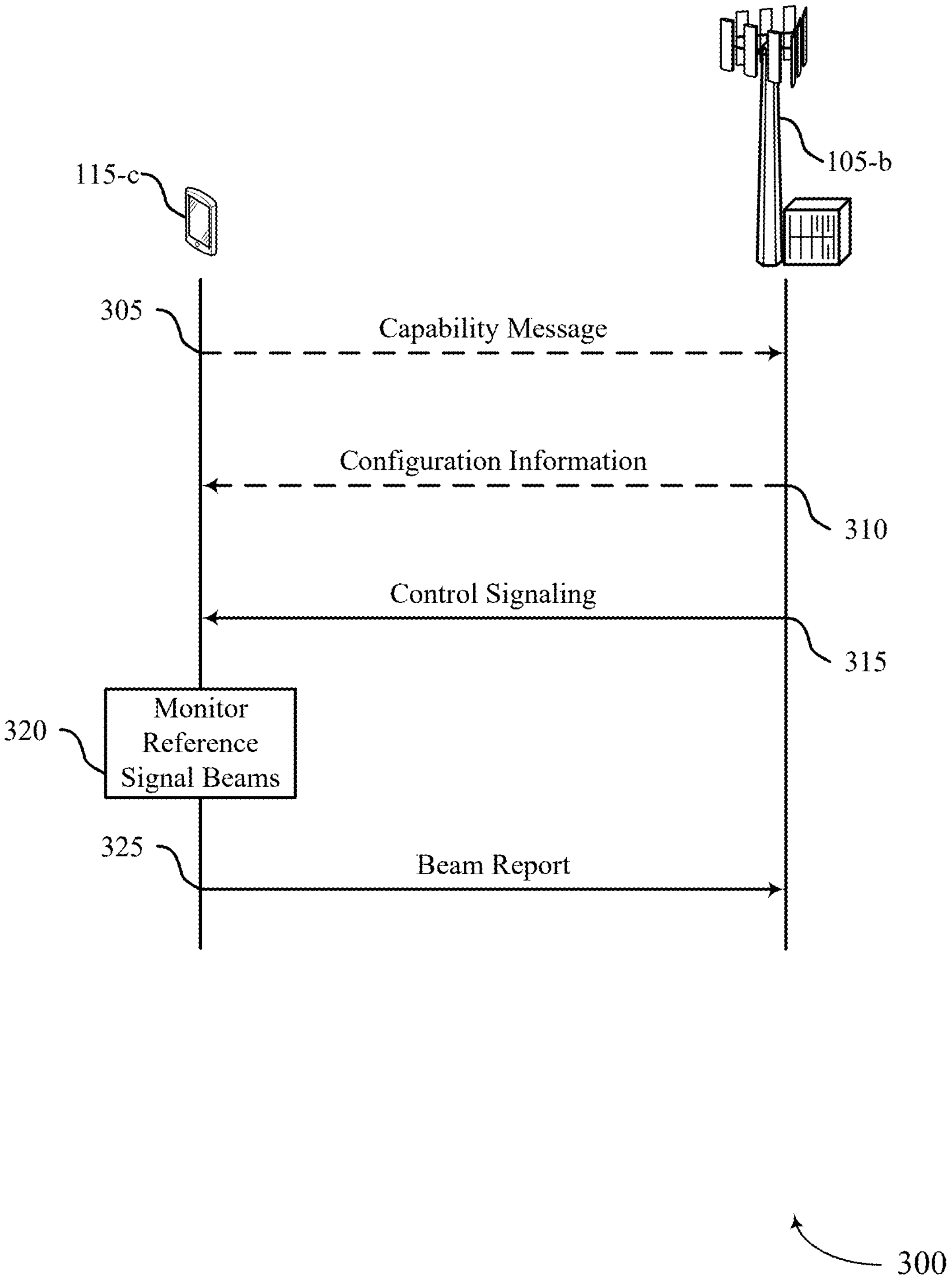
FIG. 3 shows an example of a process flow that supports methods for feedback of signal strength metrics of different signal strength groups with reference signal training in accordance with one or more aspects of the present disclosure.

FIG. 3 shows an example of a process flow 300 that supports methods for feedback of signal strength metrics of different signal strength groups with reference signal training in accordance with one or more aspects of the present disclosure. The process flow 300 may be implemented by aspects of the wireless communications systems 100 and 200. For example, a UE 115-*c* and a network entity 105-*b*, which may be examples of a UE 115 or a network entity 105 as described herein, may perform aspects of the process flow 300. In the following description of the process flow 300, operations performed by the UE 115-*c* and the network entity 105-*b* may be performed in a different order than is shown. Some operations may be omitted from the process flow 300, and other operations may be added to the process flow 300. Further, although some operations or signaling may be shown to occur at different times for discussion purposes, these operations may occur at the same time. As described herein, it may be understood that reference signal beams may refer to reference signals transmitted over one or more beams (e.g., via beam weights over an antenna array).

At 305, the UE 115-*c* may transmit a capability message indicating multiple antenna modules of the UE 115-*c*. For example, the capability message may indicate the one or more antenna modules 205 as described with reference to FIG. 2.

At 310, the UE 115-*c* may receive configuration information indicating at least one receive beam to use for subsequent communication with the network entity 105-*b*. In some examples, the configuration information may be based on the capability message. For example, the configuration information may indicate the UE 115-*c* to use a respective antenna module for the subsequent communication. Additionally, or alternatively, the configuration information may indicate the UE 115-*c* to switch to a different antenna module for communication (e.g., based on a receive beam being blocked at another antenna module).

At 315, the UE 115-*c* may receive control signaling indicating a first signal strength threshold and a second signal strength threshold. The first signal strength threshold and the second signal strength threshold may define multiple signal strength groups, as described with reference to FIG. 2. In some examples, the control signaling may further indicate for the UE 115-*c* to report up to a respective quantity of reference signal beams for each group of the multiple signal strength groups as well as multiple reference signal resources to monitor.

In some cases, the control signaling may indicate the UE 115-*c* to report a different quantity of reference signal beams for each signal strength group. That is, the quantity of good beams and the quantity of bad beams may be different (e.g., nrofReportedRSGood and nrofReportedRSBad can be configured differently). For example, if the quantity of good beams (e.g., nrofReportedRSGood) and/or the quantity of bad beams (e.g., nrofReportedRSBad) to report in the control signaling (e.g., CSI-ReportConfig) is one, the UE 115-*c* may report a value (e.g., a L1-RSRP value) by a $K_0$-bit value in a first range of values (e.g., [−140,−44] dB). In another example, if the quantity of good beams (e.g., nrofReportedRSGood) and/or the quantity of bad beams (e.g., nrofReportedRSBad) to report is greater than one, the UE 115-*c* may use differential L1-RSRP based reporting. In the differential L1-RSRP based reporting, a largest measured value of L1-RSRP may be quantized to a $K_1$-bit value in the first range with a $K_2$ step size, and a differential L1-RSRP may be quantized to a $K_3$-bit value. In some cases, the UE 115-*c* may compute the differential L1-RSRP value with a $K_4$ step size with reference to the largest measured L1-RSRP value part of the same L1-RSRP reporting instance.

At 320, the UE 115-*c* may monitor multiple reference signal beams via the multiple reference signal resources. In some examples, the multiple reference signal beams may be SSB beams, CSI-RS beams, DMRS beams, or a combination of one or more SSB beams, one or more CSI-RS beams, and one or more DMRS beams. Based on monitoring for the multiple reference signal beams, the UE 115-*c* may receive one or more reference signal beams. In some examples, the UE 115-*c* may receive the one or more reference signal beams across one or more antenna modules (e.g., the UE 115-*c* may receive a first reference signal beam at a first antenna module and at a second antenna module). In such examples, a measured signal strength of the one or more reference signal beams may differ between the one or more antenna modules (e.g., the first reference signal beam may have a higher signal strength at the first antenna module, but a lower signal strength at the second antenna module).

At 325, the UE 115-*c* may transmit a report indicating a quantity of reference signal beams up to the respective quantity of reference signal beams in each group of the multiple signal strength groups based on a signal strength measurement of a respective reference signal beam of the quantity of reference signal beams relative to the first signal strength threshold, the second signal strength threshold, or both. The report may further indicate one or more resource indicators, one or more reference signal identifiers, or both. In some examples, the signal strength measurement may be an RSRP measurement associated with a reference signal beam of the multiple reference signal beams, an SINR measurement associated with a reference signal beam of the multiple reference signal beams, or both.

In some examples, the report may indicate a range (e.g., a subset) of reference signal identifiers associated with one or more groups of the multiple signal strength groups. For example, the UE 115-*c* may receive a relatively large quantity of reference signal beams, which may result in a relatively large measurement and/or reporting overhead at the UE 115-*c*. The UE 115-*c* may report the range of identifiers (e.g., SSB IDs) to reduce the measurement and/or reporting overhead. For example, the network entity 105-*b* may transmit 64 reference signal beams. To reduce the overhead, the network entity 105-*b* may define ranges of 8 reference signal beams and may indicate (e.g., via the control signaling) range identifiers associated with the 8 ranges. Based on the defined ranges, the UE 115-*c* may report a range identifier for one or more of the 8 ranges. In other words, the UE 115-*c* may report 8 range identifiers rather than 64 reference signal beams.

Additionally, or alternatively, the report may indicate the signal strength measurement of one or more reference signal beams of the multiple reference signal beams for one or more groups of the multiple signal strength groups. In some examples, the report may indicate the highest signal strength measurements and the lowest signal strength measurements of the one or more reference signal beams over the range of identifiers.

In some examples, the report may further indicate the quantity of reference signal beams up to the respective quantity of reference signal beams in each group for each antenna module (e.g., or antenna panel) based on a signal strength measurement of a respective reference signal beam at a respective antenna module relative to the first signal strength threshold, the second signal strength threshold, or both.

As described further with reference to FIG. 2, the multiple signal strength groups may include a first signal strength group of reference signal beams with respective signal strength measurements above the first signal strength threshold, a second signal strength group of reference signal beams with respective signal strength measurements between the first signal strength threshold and the second signal strength threshold, a third signal strength group of reference signal beams with respective signal strength measurements below the second signal strength threshold, or any combination thereof.

Figure 4:
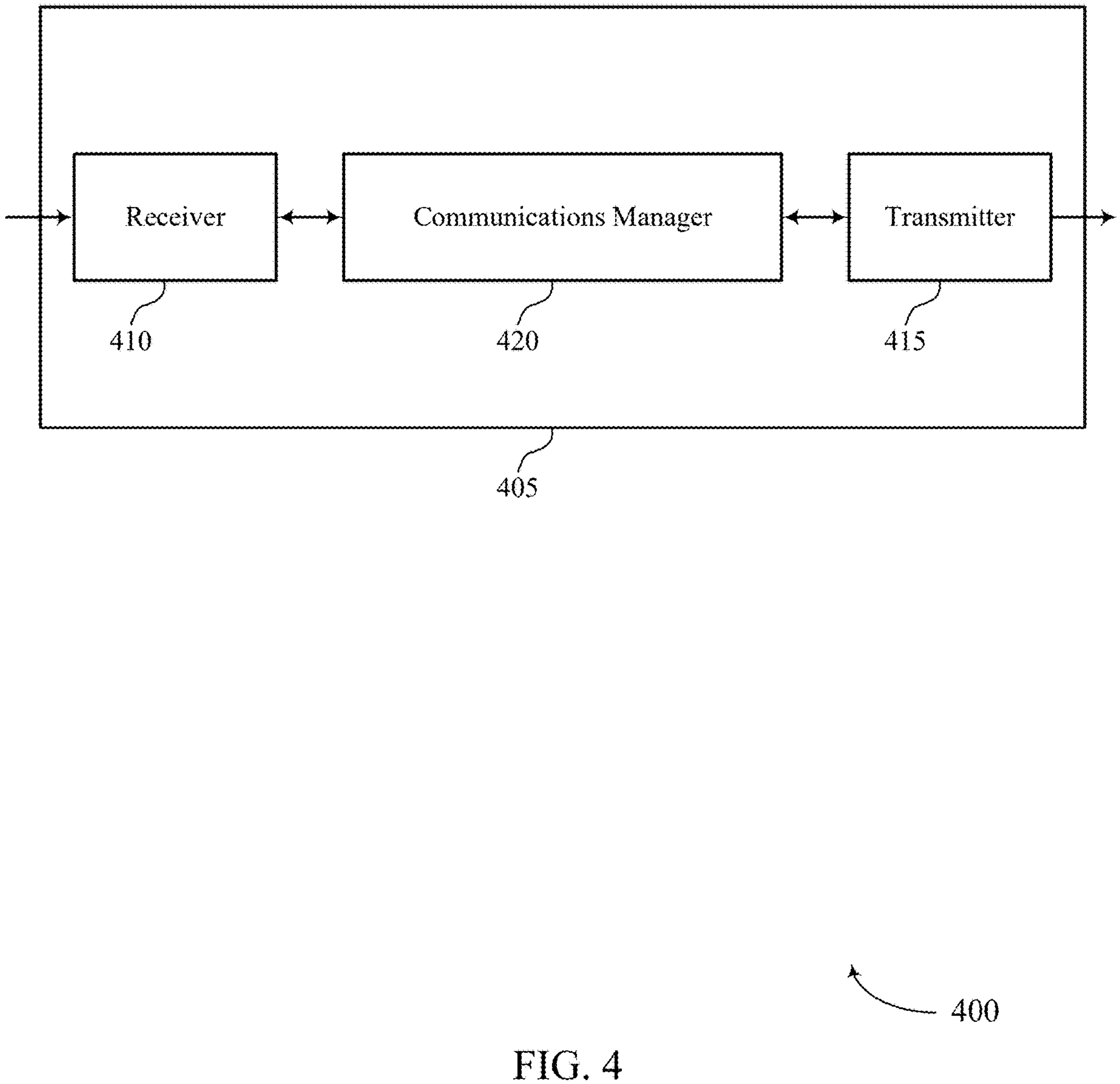
FIGS. 4 and 5 show block diagrams of devices that support methods for feedback of signal strength metrics of different signal strength groups with reference signal training in accordance with one or more aspects of the present disclosure.

FIG. 4 shows a block diagram 400 of a device 405 that supports methods for feedback of signal strength metrics of different signal strength groups with reference signal training in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to methods for feedback of signal strength metrics of different signal strength groups with reference signal training). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to methods for feedback of signal strength metrics of different signal strength groups with reference signal training). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations or components thereof may be examples of means for performing various aspects of methods for feedback of signal strength metrics of different signal strength groups with reference signal training as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor (e.g., referred to as a processor-executable code). If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for receiving control signaling indicating a first signal strength threshold and a second signal strength threshold, the first signal strength threshold and the second signal strength threshold defining a set of multiple signal strength groups, where the control signaling further indicates to report up to a respective quantity of reference signal beams for each group of the set of multiple signal strength groups and a set of multiple reference signal resources to monitor. The communications manager 420 is capable of, configured to, or operable to support a means for monitoring a set of multiple reference signal beams via the set of multiple reference signal resources. The communications manager 420 is capable of, configured to, or operable to support a means for transmitting a report indicating a quantity of reference signal beams up to the respective quantity of reference signal beams in each group of the set of multiple signal strength groups based on a signal strength measurement of a respective reference signal beam of the quantity of reference signal beams relative to the first signal strength threshold, the second signal strength threshold, or both.

Additionally, or alternatively, the communications manager 420 may support wireless communications at a UE in accordance with examples as disclosed herein. For example, the communications manager 420 is capable of, configured to, or operable to support a means for receiving control signaling indicating a first signal strength threshold and a second signal strength threshold, the first signal strength threshold and the second signal strength threshold defining a set of multiple signal strength groups, where the control signaling further indicates to report up to a respective quantity of reference signal beams for each group of the set of multiple signal strength groups and a set of multiple reference signal resources to monitor. The communications manager 420 is capable of, configured to, or operable to support a means for monitoring a set of multiple reference signal beams via the set of multiple reference signal resources. The communications manager 420 is capable of, configured to, or operable to support a means for transmitting a report indicating a quantity of reference signal beams up to the respective quantity of reference signal beams in each group of the set of multiple signal strength groups based on a signal strength measurement of a respective reference signal beam of the quantity of reference signal beams relative to the first signal strength threshold, the second signal strength threshold, or both.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for more efficient utilization of communication resources, among other examples.

Figure 5:
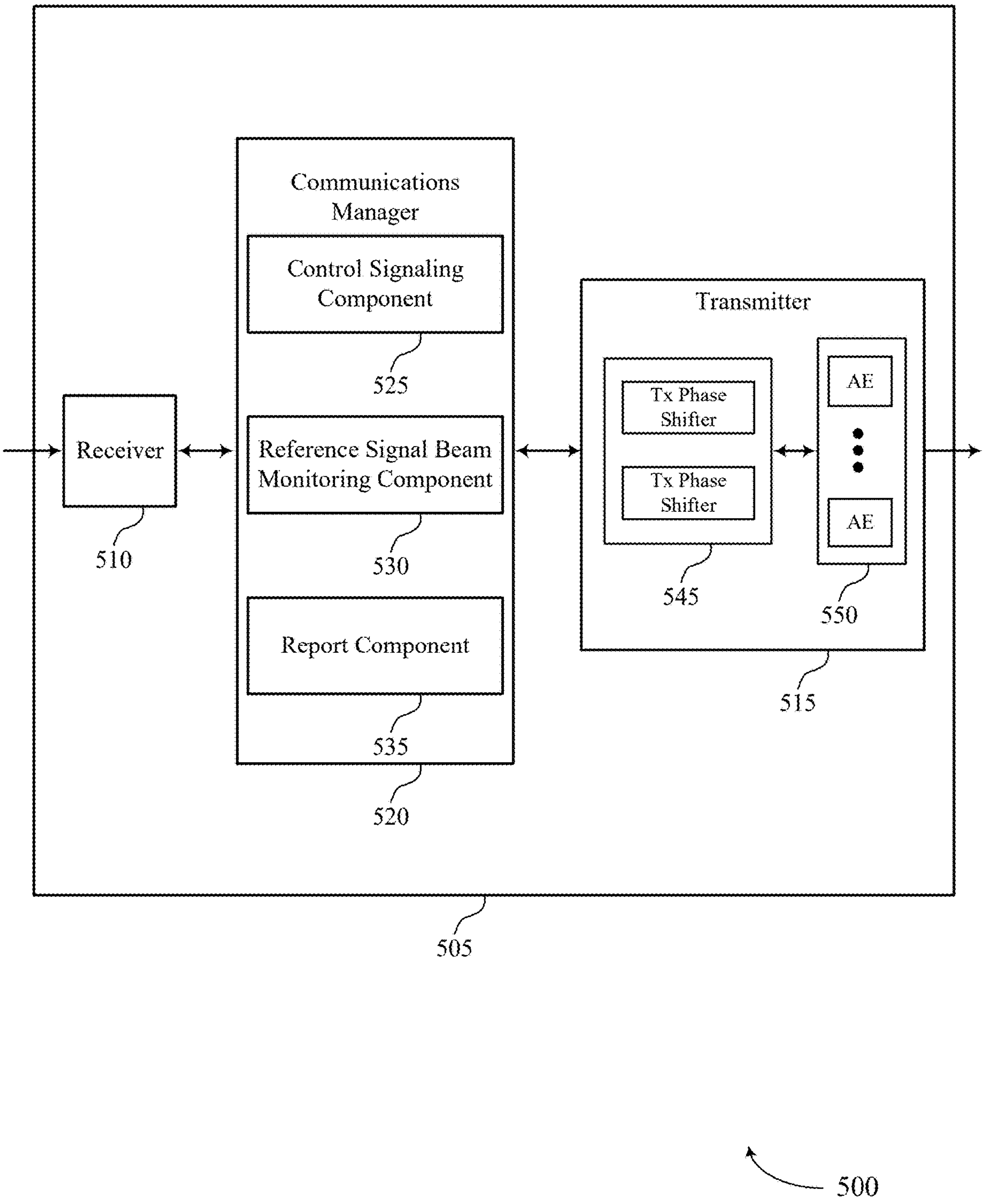

FIG. 5 shows a block diagram 500 of a device 505 that supports methods for feedback of signal strength metrics of different signal strength groups with reference signal training in accordance with one or more aspects of the present disclosure. The device 505 may be an example of aspects of a device 405 or a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to methods for feedback of signal strength metrics of different signal strength groups with reference signal training). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to methods for feedback of signal strength metrics of different signal strength groups with reference signal training). In some examples, the transmitter 515 may be co-located with a receiver 510 in a transceiver module. The transmitter 515 may utilize a single antenna or a set of multiple antennas.

The phase shifter 545 may provide a configurable phase shift or phase offset to a corresponding RF signal to be transmitted on a respective antenna element. The settings of each of the phase shifters 545 may be independent meaning that each can be set to provide a desired amount of phase shift or the same amount of phase shift or some other configuration. A modem or other processor may have at least one control line connected to each of the phase shifters 545 and which may be used to configure the phase shifters 545 to provide a desired amounts of phase shift or phase offset between antenna elements 550.

In at least one embodiment, changing or receiving a transmit or receive beam comprises adjusting relative phase shifts for signals on different antenna elements. The relative phase shifts may be achieved by the modem adjusting the phase shift of one or more phase shifters. The set of phases for different phase shifters (and corresponding antenna elements) may comprise the spatial receive parameters or spatial transmit parameters for a respective beam. To receive or transmit on a beam, the spatial parameters may need to be set before the beginning of the transmitting or receiving.

The device 505, or various components thereof, may be an example of means for performing various aspects of methods for feedback of signal strength metrics of different signal strength groups with reference signal training as described herein. For example, the communications manager 520 may include a control signaling component 525, a reference signal beam monitoring component 530, a report component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The control signaling component 525 is capable of, configured to, or operable to support a means for receiving control signaling indicating a first signal strength threshold and a second signal strength threshold, the first signal strength threshold and the second signal strength threshold defining a set of multiple signal strength groups, where the control signaling further indicates to report up to a respective quantity of reference signal beams for each group of the set of multiple signal strength groups and a set of multiple reference signal resources to monitor. The reference signal beam monitoring component 530 is capable of, configured to, or operable to support a means for monitoring a set of multiple reference signal beams via the set of multiple reference signal resources. The report component 535 is capable of, configured to, or operable to support a means for transmitting a report indicating a quantity of reference signal beams up to the respective quantity of reference signal beams in each group of the set of multiple signal strength groups based on a signal strength measurement of a respective reference signal beam of the quantity of reference signal beams relative to the first signal strength threshold, the second signal strength threshold, or both.

Additionally, or alternatively, the communications manager 520 may support wireless communications at a UE in accordance with examples as disclosed herein. The control signaling component 525 is capable of, configured to, or operable to support a means for receiving control signaling indicating a first signal strength threshold and a second signal strength threshold, the first signal strength threshold and the second signal strength threshold defining a set of multiple signal strength groups, where the control signaling further indicates to report up to a respective quantity of reference signal beams for each group of the set of multiple signal strength groups and a set of multiple reference signal resources to monitor. The reference signal beam monitoring component 530 is capable of, configured to, or operable to support a means for monitoring a set of multiple reference signal beams via the set of multiple reference signal resources. The report component 535 is capable of, configured to, or operable to support a means for transmitting a report indicating a quantity of reference signal beams up to the respective quantity of reference signal beams in each group of the set of multiple signal strength groups based on a signal strength measurement of a respective reference signal beam of the quantity of reference signal beams relative to the first signal strength threshold, the second signal strength threshold, or both.

Figure 6:
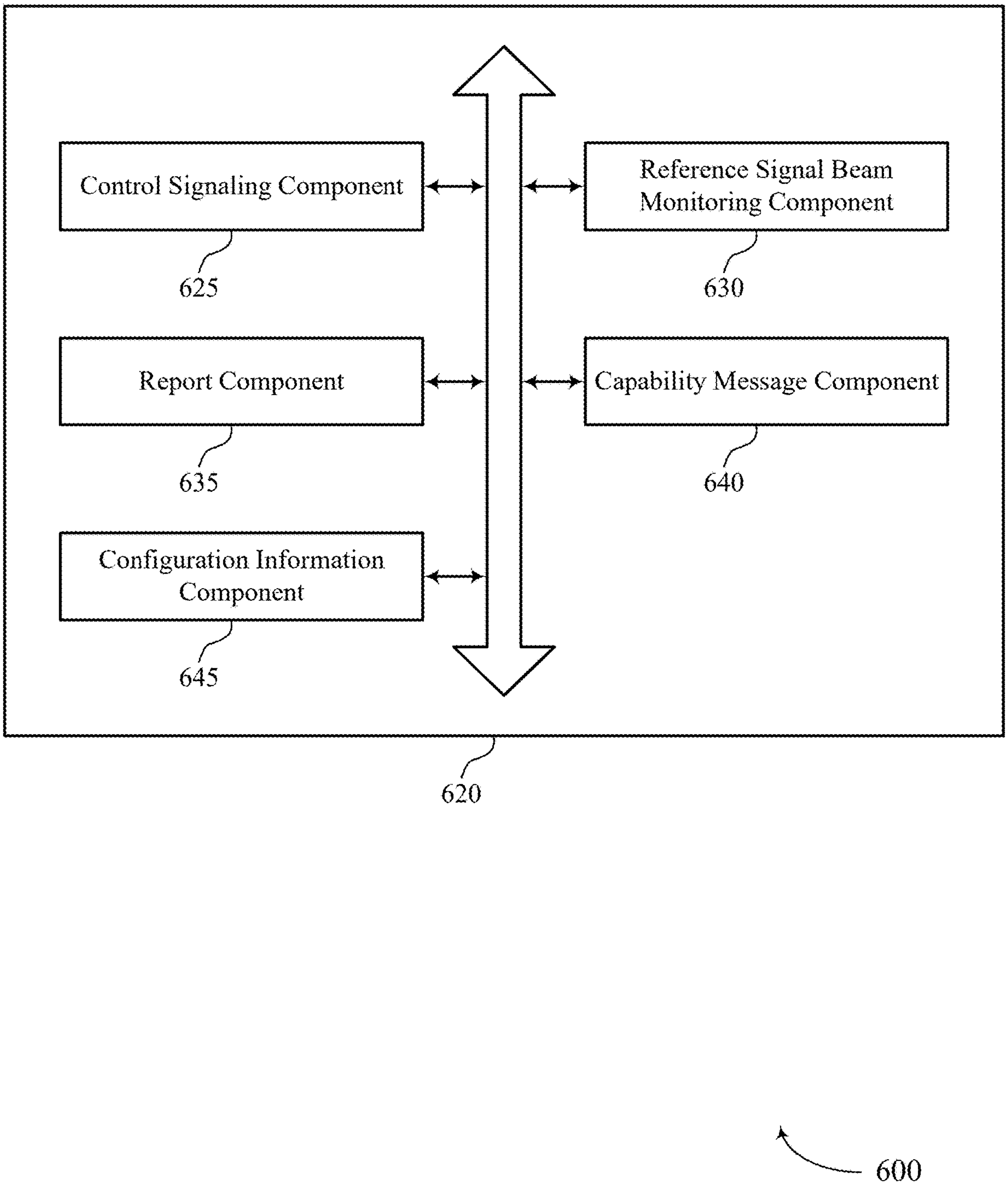
FIG. 6 shows a block diagram of a communications manager that supports methods for feedback of signal strength metrics of different signal strength groups with reference signal training in accordance with one or more aspects of the present disclosure.

FIG. 6 shows a block diagram 600 of a communications manager 620 that supports methods for feedback of signal strength metrics of different signal strength groups with reference signal training in accordance with one or more aspects of the present disclosure. The communications manager 620 may be an example of aspects of a communications manager 420, a communications manager 520, or both, as described herein. The communications manager 620, or various components thereof, may be an example of means for performing various aspects of methods for feedback of signal strength metrics of different signal strength groups with reference signal training as described herein. For example, the communications manager 620 may include a control signaling component 625, a reference signal beam monitoring component 630, a report component 635, a capability message component 640, a configuration information component 645, or any combination thereof. Each of these components, or components or subcomponents thereof (e.g., one or more processors, one or more memories), may communicate, directly or indirectly, with one another (e.g., via one or more buses).

The communications manager 620 may support wireless communications in accordance with examples as disclosed herein. The control signaling component 625 is capable of, configured to, or operable to support a means for receiving control signaling indicating a first signal strength threshold and a second signal strength threshold, the first signal strength threshold and the second signal strength threshold defining a set of multiple signal strength groups, where the control signaling further indicates to report up to a respective quantity of reference signal beams for each group of the set of multiple signal strength groups and a set of multiple reference signal resources to monitor. The reference signal beam monitoring component 630 is capable of, configured to, or operable to support a means for monitoring a set of multiple reference signal beams via the set of multiple reference signal resources. The report component 635 is capable of, configured to, or operable to support a means for transmitting a report indicating a quantity of reference signal beams up to the respective quantity of reference signal beams in each group of the set of multiple signal strength groups based on a signal strength measurement of a respective reference signal beam of the quantity of reference signal beams relative to the first signal strength threshold, the second signal strength threshold, or both.

In some examples, the capability message component 640 is capable of, configured to, or operable to support a means for transmitting a capability message indicating a set of multiple antenna modules of the UE, where the report further indicates the quantity of reference signal beams up to the respective quantity of reference signal beams in each group for each antenna module based on a signal strength measurement of a respective reference signal beam at a respective antenna module relative to the first signal strength threshold, the second signal strength threshold, or both.

In some examples, the configuration information component 645 is capable of, configured to, or operable to support a means for receiving, based on the report, configuration information indicating at least one receive beam to use for subsequent communication with a network entity.

In some examples, the report indicates a range of reference signal identifiers associated with one or more groups of the set of multiple signal strength groups. In some examples, the report further indicates one or more resource indicators, one or more reference signal identifiers, or both. In some examples, the report further indicates a signal strength measurement of one or more reference signal beams of the quantity of reference signal beams for one or more groups of the set of multiple signal strength groups.

In some examples, the set of multiple signal strength groups include a first signal strength group of reference signal beams with respective signal strength measurements above the first signal strength threshold, a second signal strength group of reference signal beams with respective signal strength measurements between the first signal strength threshold and the second signal strength threshold, a third signal strength group of reference signal beams with respective signal strength measurements below the second signal strength threshold, or any combination thereof.

In some examples, the set of multiple reference signal beams are synchronization signal block beams, channel state information reference signal beams, demodulation reference signal beams, or a combination of one or more synchronization signal block beams, one or more channel state information reference signal beams, and one or more demodulation reference signal beams. In some examples, the signal strength measurement is a reference signal received power measurement associated with a reference signal beam of the set of multiple reference signal beams, a signal to interference and noise ratio measurement associated with a reference signal beam of the set of multiple reference signal beams, or both.

Additionally, or alternatively, the communications manager 620 may support wireless communications at a UE in accordance with examples as disclosed herein. In some examples, the control signaling component 625 is capable of, configured to, or operable to support a means for receiving control signaling indicating a first signal strength threshold and a second signal strength threshold, the first signal strength threshold and the second signal strength threshold defining a set of multiple signal strength groups, where the control signaling further indicates to report up to a respective quantity of reference signal beams for each group of the set of multiple signal strength groups and a set of multiple reference signal resources to monitor. In some examples, the reference signal beam monitoring component 630 is capable of, configured to, or operable to support a means for monitoring a set of multiple reference signal beams via the set of multiple reference signal resources. In some examples, the report component 635 is capable of, configured to, or operable to support a means for transmitting a report indicating a quantity of reference signal beams up to the respective quantity of reference signal beams in each group of the set of multiple signal strength groups based on a signal strength measurement of a respective reference signal beam of the quantity of reference signal beams relative to the first signal strength threshold, the second signal strength threshold, or both.

In some examples, the capability message component 640 is capable of, configured to, or operable to support a means for transmitting a capability message indicating a set of multiple antenna modules of the UE, where the report further indicates the quantity of reference signal beams up to the respective quantity of reference signal beams in each group for each antenna module based on a signal strength measurement of a respective reference signal beam at a respective antenna module relative to the first signal strength threshold, the second signal strength threshold, or both.

Figure 7:
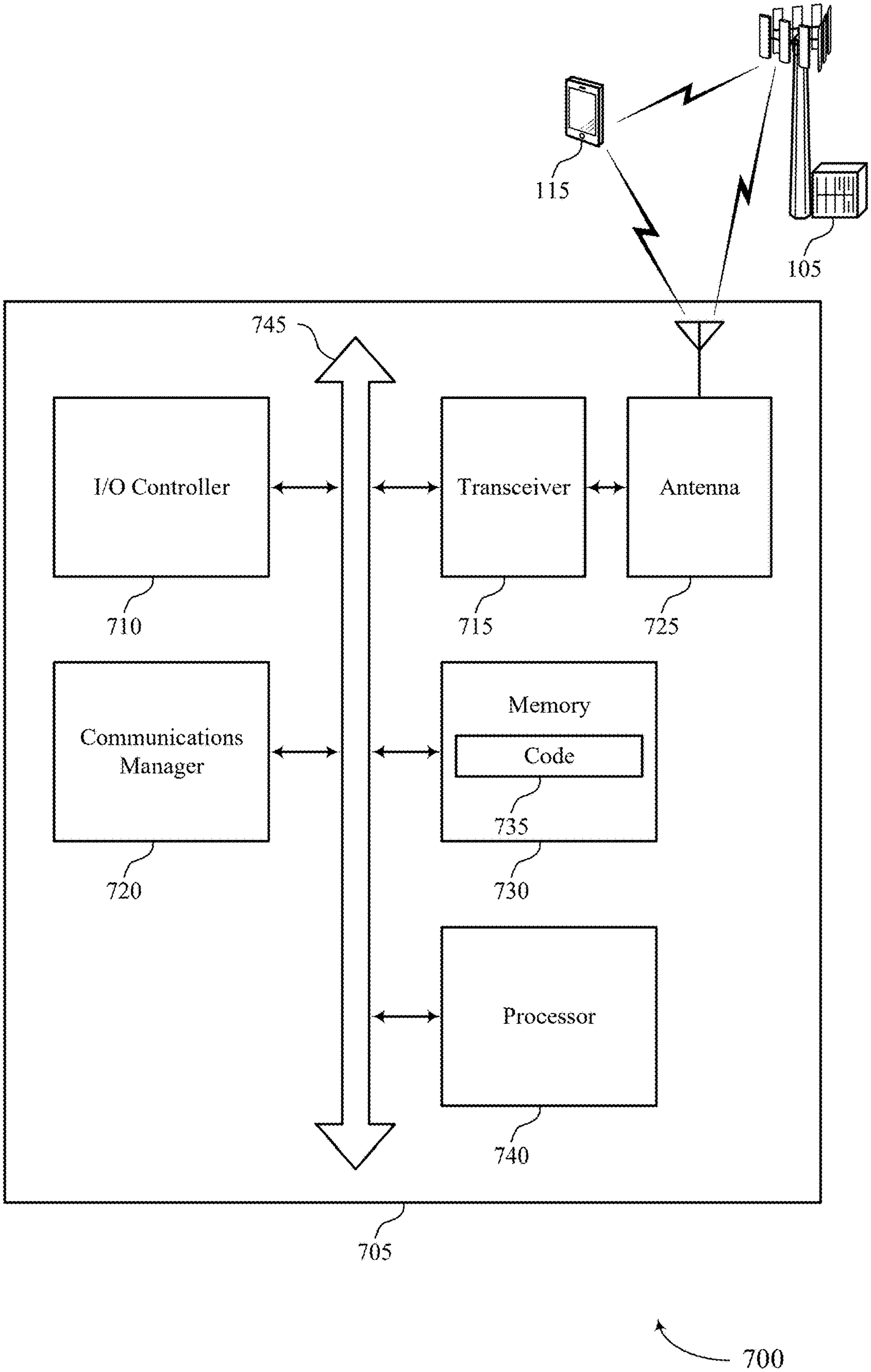
FIG. 7 shows a diagram of a system including a device that supports methods for feedback of signal strength metrics of different signal strength groups with reference signal training in accordance with one or more aspects of the present disclosure.

FIG. 7 shows a diagram of a system 700 including a device 705 that supports methods for feedback of signal strength metrics of different signal strength groups with reference signal training in accordance with one or more aspects of the present disclosure. The device 705 may be an example of or include components of a device 405, a device 505, or a UE 115 as described herein. The device 705 may communicate (e.g., wirelessly) with one or more other devices (e.g., network entities 105, UEs 115, or a combination thereof). The device 705 may include components for bi-directional voice and data communications including components for transmitting and receiving communications, such as a communications manager 720, an input/output (I/O) controller, such as an I/O controller 710, a transceiver 715, one or more antennas 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna. However, in some other cases, the device 705 may have more than one antenna, which may be capable of concurrently transmitting or receiving multiple wireless transmissions. The transceiver 715 may communicate bi-directionally via the one or more antennas 725 using wired or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable, or processor-executable code, such as the code 735. The code 735 may include instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may include, among other things, a basic I/O system (BIOS) which may control basic hardware or software operation such as the interaction with peripheral components or devices.

The at least one processor 740 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting methods for feedback of signal strength metrics of different signal strength groups with reference signal training). For example, the device 705 or a component of the device 705 may include at least one processor 740 and at least one memory 730 coupled with or to the at least one processor 740, the at least one processor 740 and the at least one memory 730 configured to perform various functions described herein.

In some examples, the at least one processor 740 may include multiple processors and the at least one memory 730 may include multiple memories. One or more of the multiple processors may be coupled with one or more of the multiple memories, which may, individually or collectively, be configured to perform various functions described herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. For example, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code 735 (e.g., processor-executable code) stored in the at least one memory 730 or otherwise, to perform one or more of the functions described herein.

The communications manager 720 may support wireless communications in accordance with examples as disclosed herein. For example, the communications manager 720 is capable of, configured to, or operable to support a means for receiving control signaling indicating a first signal strength threshold and a second signal strength threshold, the first signal strength threshold and the second signal strength threshold defining a set of multiple signal strength groups, where the control signaling further indicates to report up to a respective quantity of reference signal beams for each group of the set of multiple signal strength groups and a set of multiple reference signal resources to monitor. The communications manager 720 is capable of, configured to, or operable to support a means for monitoring a set of multiple reference signal beams via the set of multiple reference signal resources. The communications manager 720 is capable of, configured to, or operable to support a means for transmitting a report indicating a quantity of reference signal beams up to the respective quantity of reference signal beams in each group of the set of multiple signal strength groups based on a signal strength measurement of a respective reference signal beam of the quantity of reference signal beams relative to the first signal strength threshold, the second signal strength threshold, or both.

Additionally, or alternatively, the communications manager 720 may support wireless communications at a UE in accordance with examples as disclosed herein. For example, the communications manager 720 is capable of, configured to, or operable to support a means for receiving control signaling indicating a first signal strength threshold and a second signal strength threshold, the first signal strength threshold and the second signal strength threshold defining a set of multiple signal strength groups, where the control signaling further indicates to report up to a respective quantity of reference signal beams for each group of the set of multiple signal strength groups and a set of multiple reference signal resources to monitor. The communications manager 720 is capable of, configured to, or operable to support a means for monitoring a set of multiple reference signal beams via the set of multiple reference signal resources. The communications manager 720 is capable of, configured to, or operable to support a means for transmitting a report indicating a quantity of reference signal beams up to the respective quantity of reference signal beams in each group of the set of multiple signal strength groups based on a signal strength measurement of a respective reference signal beam of the quantity of reference signal beams relative to the first signal strength threshold, the second signal strength threshold, or both.

By including or configuring the communications manager 720 in accordance with examples as described herein, the device 705 may support techniques for improved communication reliability, reduced latency, more efficient utilization of communication resources, improved coordination between devices, and improved utilization of processing capability, among other examples.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of methods for feedback of signal strength metrics of different signal strength groups with reference signal training as described herein, or the at least one processor 740 and the at least one memory 730 may be otherwise configured to, individually or collectively, perform or support such operations.

Figure 8:
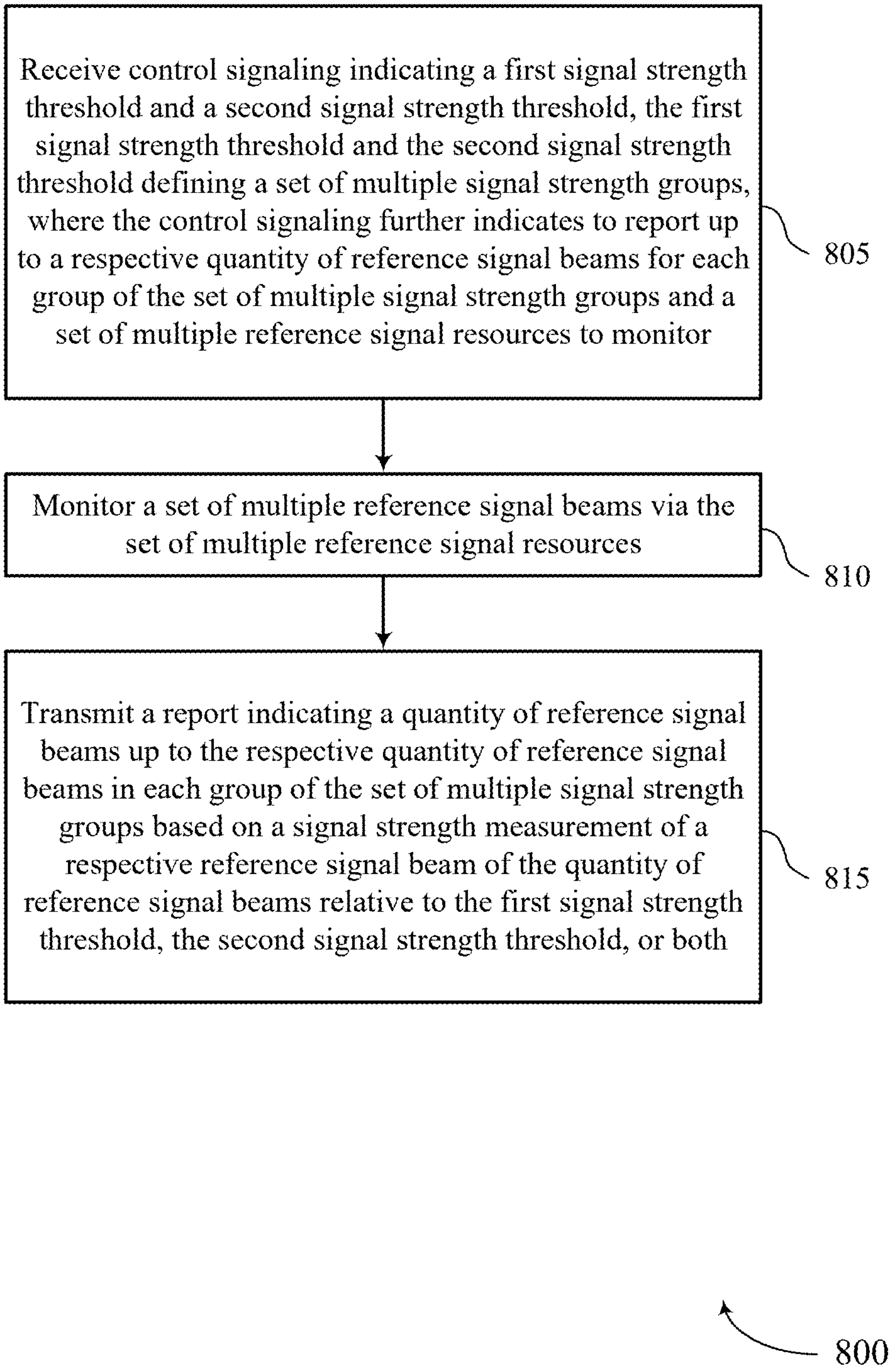
FIGS. 8 and 9 show flowcharts illustrating methods that support methods for feedback of signal strength metrics of different signal strength groups with reference signal training in accordance with one or more aspects of the present disclosure.

FIG. 8 shows a flowchart illustrating a method 800 that supports methods for feedback of signal strength metrics of different signal strength groups with reference signal training in accordance with one or more aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 805, the method may include receiving control signaling indicating a first signal strength threshold and a second signal strength threshold, the first signal strength threshold and the second signal strength threshold defining a set of multiple signal strength groups, where the control signaling further indicates to report up to a respective quantity of reference signal beams for each group of the set of multiple signal strength groups and a set of multiple reference signal resources to monitor. The operations of 805 may be performed in accordance with examples as disclosed herein. In some examples, aspects of the operations of 805 may be performed by a control signaling component 625 as described with reference to FIG. 6.

At 810, the method may include monitoring a set of multiple reference signal beams via the set of multiple reference signal resources. The operations of 810 may be performed in accordance with examples as disclosed herein. In some examples, aspects of the operations of 810 may be performed by a reference signal beam monitoring component 630 as described with reference to FIG. 6.

At 815, the method may include transmitting a report indicating a quantity of reference signal beams up to the respective quantity of reference signal beams in each group of the set of multiple signal strength groups based on a signal strength measurement of a respective reference signal beam of the quantity of reference signal beams relative to the first signal strength threshold, the second signal strength threshold, or both. The operations of 815 may be performed in accordance with examples as disclosed herein. In some examples, aspects of the operations of 815 may be performed by a report component 635 as described with reference to FIG. 6.

Figure 9:
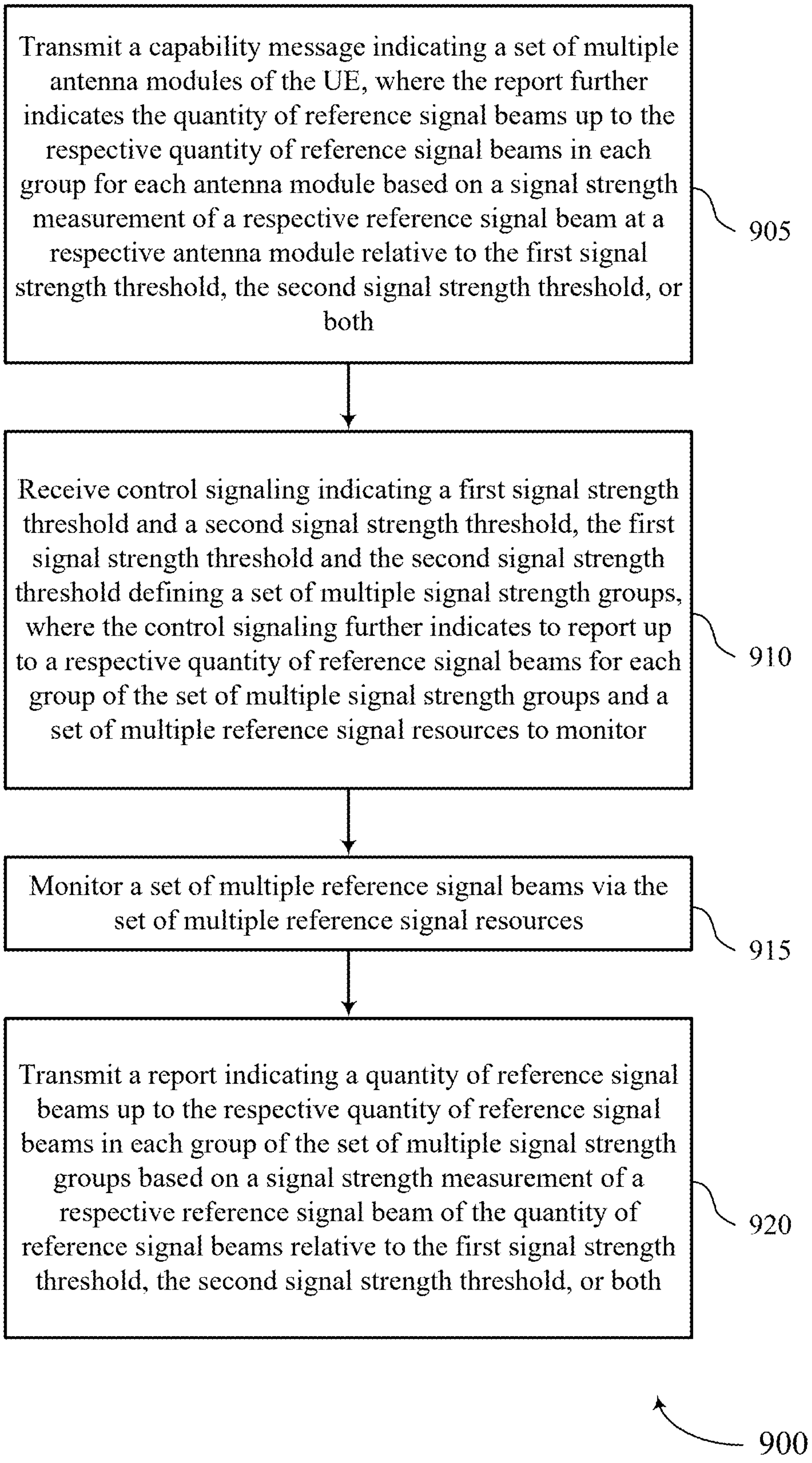

FIG. 9 shows a flowchart illustrating a method 900 that supports methods for feedback of signal strength metrics of different signal strength groups with reference signal training in accordance with one or more aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 905, the method may include transmitting a capability message indicating a set of multiple antenna modules of the UE, where the report further indicates the quantity of reference signal beams up to the respective quantity of reference signal beams in each group for each antenna module based on a signal strength measurement of a respective reference signal beam at a respective antenna module relative to the first signal strength threshold, the second signal strength threshold, or both. The operations of 905 may be performed in accordance with examples as disclosed herein. In some examples, aspects of the operations of 905 may be performed by a capability message component 640 as described with reference to FIG. 6.

At 910, the method may include receiving control signaling indicating a first signal strength threshold and a second signal strength threshold, the first signal strength threshold and the second signal strength threshold defining a set of multiple signal strength groups, where the control signaling further indicates to report up to a respective quantity of reference signal beams for each group of the set of multiple signal strength groups and a set of multiple reference signal resources to monitor. The operations of 910 may be performed in accordance with examples as disclosed herein. In some examples, aspects of the operations of 910 may be performed by a control signaling component 625 as described with reference to FIG. 6.

At 915, the method may include monitoring a set of multiple reference signal beams via the set of multiple reference signal resources. The operations of 915 may be performed in accordance with examples as disclosed herein. In some examples, aspects of the operations of 915 may be performed by a reference signal beam monitoring component 630 as described with reference to FIG. 6.

At 920, the method may include transmitting a report indicating a quantity of reference signal beams up to the respective quantity of reference signal beams in each group of the set of multiple signal strength groups based on a signal strength measurement of a respective reference signal beam of the quantity of reference signal beams relative to the first signal strength threshold, the second signal strength threshold, or both. The operations of 920 may be performed in accordance with examples as disclosed herein. In some examples, aspects of the operations of 920 may be performed by a report component 635 as described with reference to FIG. 6.

The following provides an overview of aspects of the present disclosure:

Aspect 1: A method for wireless communications at a UE, comprising: receiving control signaling indicating a first signal strength threshold and a second signal strength threshold, the first signal strength threshold and the second signal strength threshold defining a plurality of signal strength groups, wherein the control signaling further indicates to report up to a respective quantity of reference signal beams for each group of the plurality of signal strength groups and a plurality of reference signal resources to monitor; monitoring a plurality of reference signal beams via the plurality of reference signal resources; and transmitting a report indicating a quantity of reference signal beams up to the respective quantity of reference signal beams in each group of the plurality of signal strength groups based at least in part on a signal strength measurement of a respective reference signal beam of the quantity of reference signal beams relative to the first signal strength threshold, the second signal strength threshold, or both.

Aspect 2: The method of aspect 1, further comprising: transmitting a capability message indicating a plurality of antenna modules of the UE, wherein the report further indicates the quantity of reference signal beams up to the respective quantity of reference signal beams in each group for each antenna module based at least in part on a signal strength measurement of a respective reference signal beam at a respective antenna module relative to the first signal strength threshold, the second signal strength threshold, or both.

Aspect 3: The method of any of aspects 1 through 2, further comprising: receiving, based at least in part on the report, configuration information indicating at least one receive beam to use for subsequent communication with a network entity.

Aspect 4: The method of any of aspects 1 through 3, wherein the report indicates a range of reference signal identifiers associated with one or more groups of the plurality of signal strength groups.

Aspect 5: The method of any of aspects 1 through 4, wherein the report further indicates one or more resource indicators, one or more reference signal identifiers, or both.

Aspect 6: The method of any of aspects 1 through 5, wherein the report further indicates a signal strength measurement of one or more reference signal beams of the quantity of reference signal beams for one or more groups of the plurality of signal strength groups.

Aspect 7: The method of any of aspects 1 through 6, wherein the plurality of signal strength groups comprise a first signal strength group of reference signal beams with respective signal strength measurements above the first signal strength threshold, a second signal strength group of reference signal beams with respective signal strength measurements between the first signal strength threshold and the second signal strength threshold, a third signal strength group of reference signal beams with respective signal strength measurements below the second signal strength threshold, or any combination thereof.

Aspect 8: The method of any of aspects 1 through 7, wherein the plurality of reference signal beams are SSB beams, CSI-RS beams, DMRS beams, or a combination of one or more SSB beams, one or more CSI-RS beams, and one or more DMRS beams.

Aspect 9: The method of any of aspects 1 through 8, wherein the signal strength measurement is an RSRP measurement associated with a reference signal beam of the plurality of reference signal beams, an SINR measurement associated with a reference signal beam of the plurality of reference signal beams, or both.

Aspect 10: A UE for wireless communications, comprising one or more memories storing processor-executable code, and one or more processors coupled with the one or more memories and individually or collectively operable to execute the code to cause the UE to perform a method of any of aspects 1 through 9.

Aspect 11: A UE for wireless communications, comprising at least one means for performing a method of any of aspects 1 through 9.

Aspect 12: A non-transitory computer-readable medium storing code for wireless communications, the code comprising instructions executable by one or more processors to perform a method of any of aspects 1 through 9.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
- one or more memories storing processor-executable code; and
- one or more processors coupled with the one or more memories and individually or collectively operable to execute the code to cause the UE to:
  - receive control signaling indicating a first signal strength threshold and a second signal strength threshold, the first signal strength threshold and the second signal strength threshold defining a plurality of signal strength groups, wherein the control signaling further indicates to report up to a respective quantity of reference signal beams for each group of the plurality of signal strength groups and a plurality of reference signal resources to monitor;
  - monitor a plurality of reference signal beams via the plurality of reference signal resources; and
  - transmit a report indicating a quantity of reference signal beams up to the respective quantity of reference signal beams in each group of the plurality of signal strength groups based at least in part on a signal strength measurement of a respective reference signal beam of the quantity of reference signal beams relative to the first signal strength threshold, the second signal strength threshold, or both.

2. The UE of claim 1, wherein the one or more processors are individually or collectively further operable to execute the code to cause the UE to:
- transmit a capability message indicating a plurality of antenna modules of the UE, wherein the report further indicates the quantity of reference signal beams up to the respective quantity of reference signal beams in each group for each antenna module based at least in part on a signal strength of each reference signal beam at each antenna module relative to the first signal strength threshold, the second signal strength threshold, or both.

3. The UE of claim 1, wherein the one or more processors are individually or collectively further operable to execute the code to cause the UE to:
- receive, based at least in part on the report, configuration information indicating at least one receive beam to use for subsequent communication with a network entity.

4. The UE of claim 1, wherein the report indicates a range of reference signal identifiers associated with one or more groups of the plurality of signal strength groups.

5. The UE of claim 1, wherein the report further indicates one or more resource indicators, one or more reference signal identifiers, or both.

6. The UE of claim 1, wherein the report further indicates a signal strength measurement of one or more reference signal beams of the quantity of reference signal beams for one or more groups of the plurality of signal strength groups.

7. The UE of claim 1, wherein the plurality of signal strength groups comprise a first signal strength group of reference signal beams with respective signal strength measurements above the first signal strength threshold, a second signal strength group of reference signal beams with respective signal strength measurements between the first signal strength threshold and the second signal strength threshold, a third signal strength group of reference signal beams with respective signal strength measurements below the second signal strength threshold, or any combination thereof.

8. The UE of claim 1, wherein the plurality of reference signal beams are synchronization signal block beams, channel state information reference signal beams, demodulation reference signal beams, or a combination of one or more synchronization signal block beams, one or more channel state information reference signal beams, and one or more demodulation reference signal beams.

9. The UE of claim 1, wherein the signal strength measurement is a reference signal received power measurement associated with a reference signal beam of the plurality of reference signal beams, a signal to interference and noise ratio measurement associated with a reference signal beam of the plurality of reference signal beams, or both.

10. A method for wireless communications at a user equipment (UE), comprising:

receiving control signaling indicating a first signal strength threshold and a second signal strength threshold, the first signal strength threshold and the second signal strength threshold defining a plurality of signal strength groups, wherein the control signaling further indicates to report up to a respective quantity of reference signal beams for each group of the plurality of signal strength groups and a plurality of reference signal resources to monitor;

monitoring a plurality of reference signal beams via the plurality of reference signal resources; and transmitting a report indicating a quantity of reference signal beams up to the respective quantity of reference signal beams in each group of the plurality of signal strength groups based at least in part on a signal strength measurement of a respective reference signal beam of the quantity of reference signal beams relative to the first signal strength threshold, the second signal strength threshold, or both.

11. The method of claim 10, further comprising:

transmitting a capability message indicating a plurality of antenna modules of the UE, wherein the report further indicates the quantity of reference signal beams up to the respective quantity of reference signal beams in each group for each antenna module based at least in part on a signal strength measurement of a respective reference signal beam at a respective antenna module relative to the first signal strength threshold, the second signal strength threshold, or both.

12. The method of claim 10, further comprising:

receiving, based at least in part on the report, configuration information indicating at least one receive beam to use for subsequent communication with a network entity.

13. The method of claim 10, wherein the report indicates a range of reference signal identifiers associated with one or more groups of the plurality of signal strength groups.

14. The method of claim 10, wherein the report further indicates one or more resource indicators, one or more reference signal identifiers, or both.

15. The method of claim 10, wherein the report further indicates a signal strength measurement of one or more reference signal beams of the quantity of reference signal beams for one or more groups of the plurality of signal strength groups.

16. The method of claim 10, wherein the plurality of signal strength groups comprise a first signal strength group of reference signal beams with respective signal strength measurements above the first signal strength threshold, a second signal strength group of reference signal beams with respective signal strength measurements between the first signal strength threshold and the second signal strength threshold, a third signal strength group of reference signal beams with respective signal strength measurements below the second signal strength threshold, or any combination thereof.

17. The method of claim 10, wherein the plurality of reference signal beams are synchronization signal block beams, channel state information reference signal beams, demodulation reference signal beams, or a combination of one or more synchronization signal block beams, one or more channel state information reference signal beams, and one or more demodulation reference signal beams.

18. The method of claim 10, wherein the signal strength measurement is a reference signal received power measurement associated with a reference signal beam of the plurality of reference signal beams, a signal to interference and noise ratio measurement associated with a reference signal beam of the plurality of reference signal beams, or both.

19. A non-transitory computer-readable medium storing code for wireless communications at a user equipment (UE), the code comprising instructions executable by one or more processors to:

receive control signaling indicating a first signal strength threshold and a second signal strength threshold, the first signal strength threshold and the second signal strength threshold defining a plurality of signal strength groups, wherein the control signaling further indicates to report up to a respective quantity of reference signal beams for each group of the plurality of signal strength groups and a plurality of reference signal resources to monitor;

monitor a plurality of reference signal beams via the plurality of reference signal resources; and transmit a report indicating a quantity of reference signal beams up to the respective quantity of reference signal beams in each group of the plurality of signal strength groups based at least in part on a signal strength measurement of a respective reference signal beam of the quantity of reference signal beams relative to the first signal strength threshold, the second signal strength threshold, or both.

20. The non-transitory computer-readable medium of claim 19, wherein the instructions are further executable by the one or more processors to:

transmit a capability message indicating a plurality of antenna modules of the UE, wherein the report further indicates the quantity of reference signal beams up to the respective quantity of reference signal beams in each group for each antenna module based at least in part on a signal strength measurement of a respective reference signal beam at a respective antenna module relative to the first signal strength threshold, the second signal strength threshold, or both.

* * * * *